(12) United States Patent
Bruce et al.

(10) Patent No.: US 7,702,881 B2
(45) Date of Patent: Apr. 20, 2010

(54) METHOD AND SYSTEM FOR DATA TRANSFERS ACROSS DIFFERENT ADDRESS SPACES

(75) Inventors: Becky G. Bruce, Leander, TX (US); Michael D. Snyder, Austin, TX (US); Gary L. Whisenhunt, Austin, TX (US); Kumar Gala, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 485 days.

(21) Appl. No.: 11/669,804

(22) Filed: Jan. 31, 2007

(65) Prior Publication Data

US 2008/0183943 A1 Jul. 31, 2008

(51) Int. Cl.
*G06F 12/00* (2006.01)

(52) U.S. Cl. ............... 711/217; 711/6; 711/203; 711/207; 711/209; 711/E12.058; 711/E12.061; 711/E12.065; 711/E12.068

(58) Field of Classification Search ............... None
See application file for complete search history.

(56) References Cited

U.S. PATENT DOCUMENTS

2007/0186141 A1* 8/2007 Hashimoto et al. ......... 714/763

OTHER PUBLICATIONS

Stancevic, Dragan, "Zero Copy: User-Mode Perspective," Linux Journal, www.linuxjournal.com/node/6345, Jan. 1, 2003, 10 pages.
"Memory Models," The SPARC Architecture Manual, Version 9, SPARC International, Inc., Ed. David L. Weaver and Tom Germond, 2000, SAV09R1459912, pp. 119-132.

* cited by examiner

*Primary Examiner*—Reginald G Bragdon
*Assistant Examiner*—Shawn X Gu

(57) ABSTRACT

A processing device includes a first storage location configured to store a first value associated with a first address space, a second storage location configured to store a second value associated with a second address space, and a third storage location configured to store a third value associated with a third address space. The processing device further includes a memory management unit, which includes a first input configured to receive a first address value associated with a data transfer operation, a second input configured to receive an identifier associated with the data transfer operation, and an address space select module configured to identify a select value from the first value, the second value and the third value based on the identifier. The memory management module further includes an address modification module configured to generate a second address value based on the first address value and the select value.

20 Claims, 2 Drawing Sheets

METHOD AND SYSTEM FOR DATA TRANSFERS ACROSS DIFFERENT ADDRESS SPACES

FIELD OF THE DISCLOSURE

The present disclosure relates generally to processing systems and more particularly to address-based data transfers in processing systems.

BACKGROUND

Processing systems often utilize multiple address spaces (also known as partitions) to separate processes for operational or security reasons. To illustrate, an operating system (OS) can utilize distinct address spaces for different applications being executed, or a hypervisor (HV) can implement separate partitions so as to separate different operating systems. In many implementations, it may be desirable to transfer data between these address spaces. Examples include message-passing between applications or between operating systems and configuring input/output operations with memory-mapped peripheral components. Current systems transfer data between address spaces based on a complete rewriting of the address space configuration operated by the memory management unit (MMU). This rewriting typically entails a multiple-step approach whereby the OS or HV changes the address space context of the MMU multiple times in order to enact a data transfer between different address spaces. To illustrate, in order to transfer data between a first address space and a second address space, current systems utilize the OS or the HV to manipulate the MMU to have access to the requestor's address space and then copies data from the requestor into the OS's/HV's own address space using standard load operations. The OS or the HV then manipulates the MMU to have access to the destination's address space and again uses standard store operations to the destination. This multiple-context change and series of intermediary data transfers to enact a data transfer between different address spaces inhibits the performance of the processing system. Accordingly, an improved technique for transferring data between different address spaces would be advantageous.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
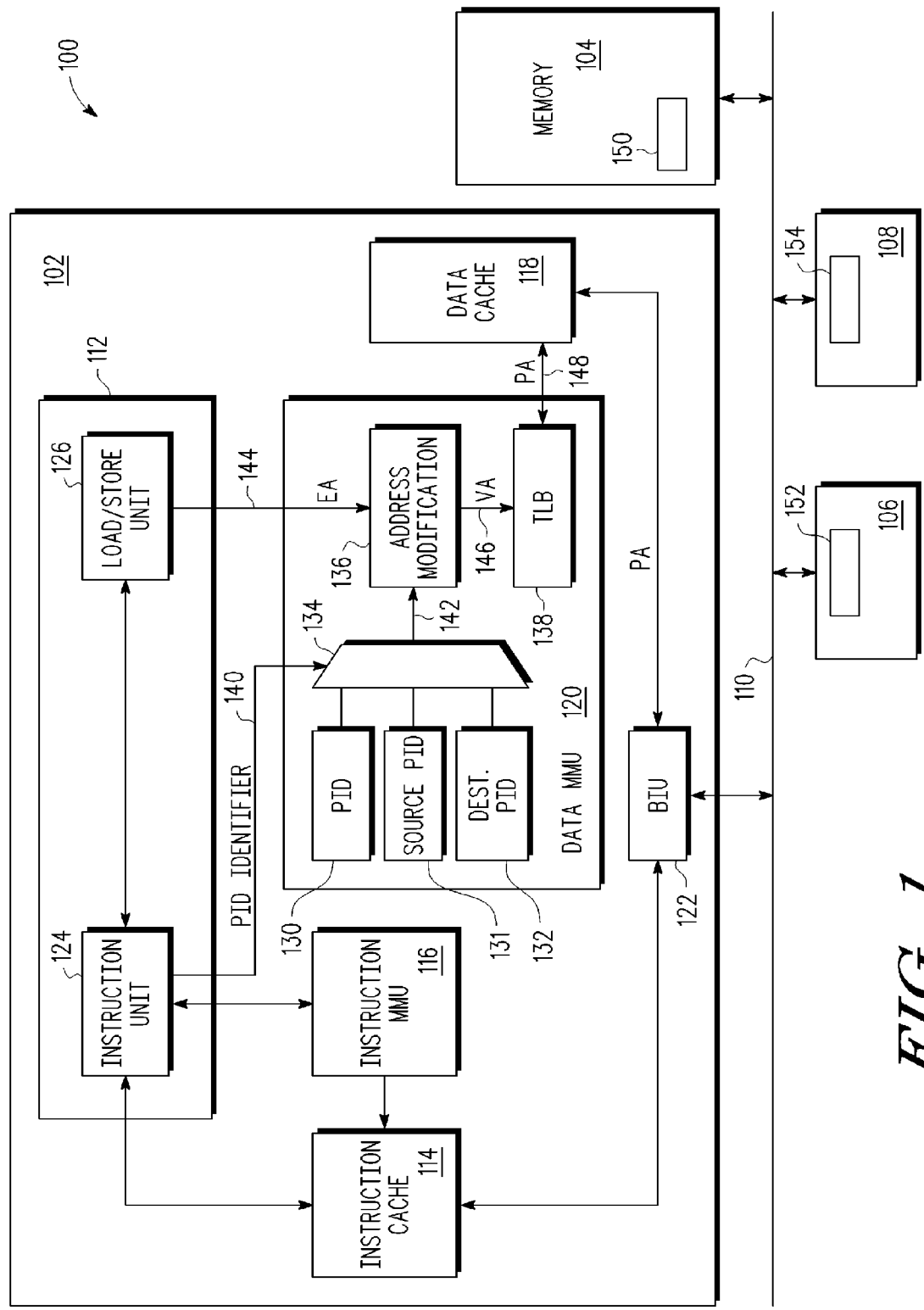
FIG. 1 is a block diagram illustrating an example processing system having a multiple-address space capability for direct transfer of data between address spaces in accordance with at least one embodiment of the present disclosure.

In accordance with one aspect of the present disclosure, a processing device is disclosed. The processing device includes a first storage location configured to store a first value associated with a first address space, a second storage location configured to store a second value associated with a second address space, and a third storage location configured to store a third value associated with a third address space. The processing device further includes a memory management unit. The memory management module includes a first input configured to receive a first address value associated with a data transfer operation, a second input configured to receive an identifier associated with the data transfer operation, and an address space select module configured to identify a select value from the first value, the second value and the third value based on the identifier. The memory management module further includes an address modification module configured to generate a second address value based on the first address value and the select value.

In accordance with another aspect of the present disclosure, a method includes receiving, at an instruction unit of a processing device, an instruction representing a data transfer operation between different address spaces of the processing device. The method further includes determining a first address value associated with the data transfer operation and determining a select value from at least three values stored at the processing device based on the data transfer operation, each of the at least three values associated with a corresponding address space of a plurality of address spaces. The method additionally includes generating, at the processing device, a second address value based on the address value and the select value.

In accordance with yet another aspect of the present disclosure, a computer readable medium embodying a set of one or more instructions is disclosed. The set of one or more instructions includes a first instruction associated with a first address value and comprising a field comprising a first identifier associated with a first address space of a plurality of address spaces. The first instruction is configured to manipulate a processing device to determine a first value of at least three values stored at the processing device based on the first identifier, each of the at least three values associated with a corresponding address space of a plurality of address spaces. The first instruction further is configured to manipulate the processing device to generate a second address value based on the first address value and the first value. The set of one or more instructions further includes a second instruction associated with a third address value and comprising a second field comprising a second identifier associated with a second address space of the plurality of address spaces. The second instruction is configured to manipulate the processing device to determine a second value of the at least three values based on the second identifier and to generate a fourth address value based on the third address value and the second value.

Figure 2:
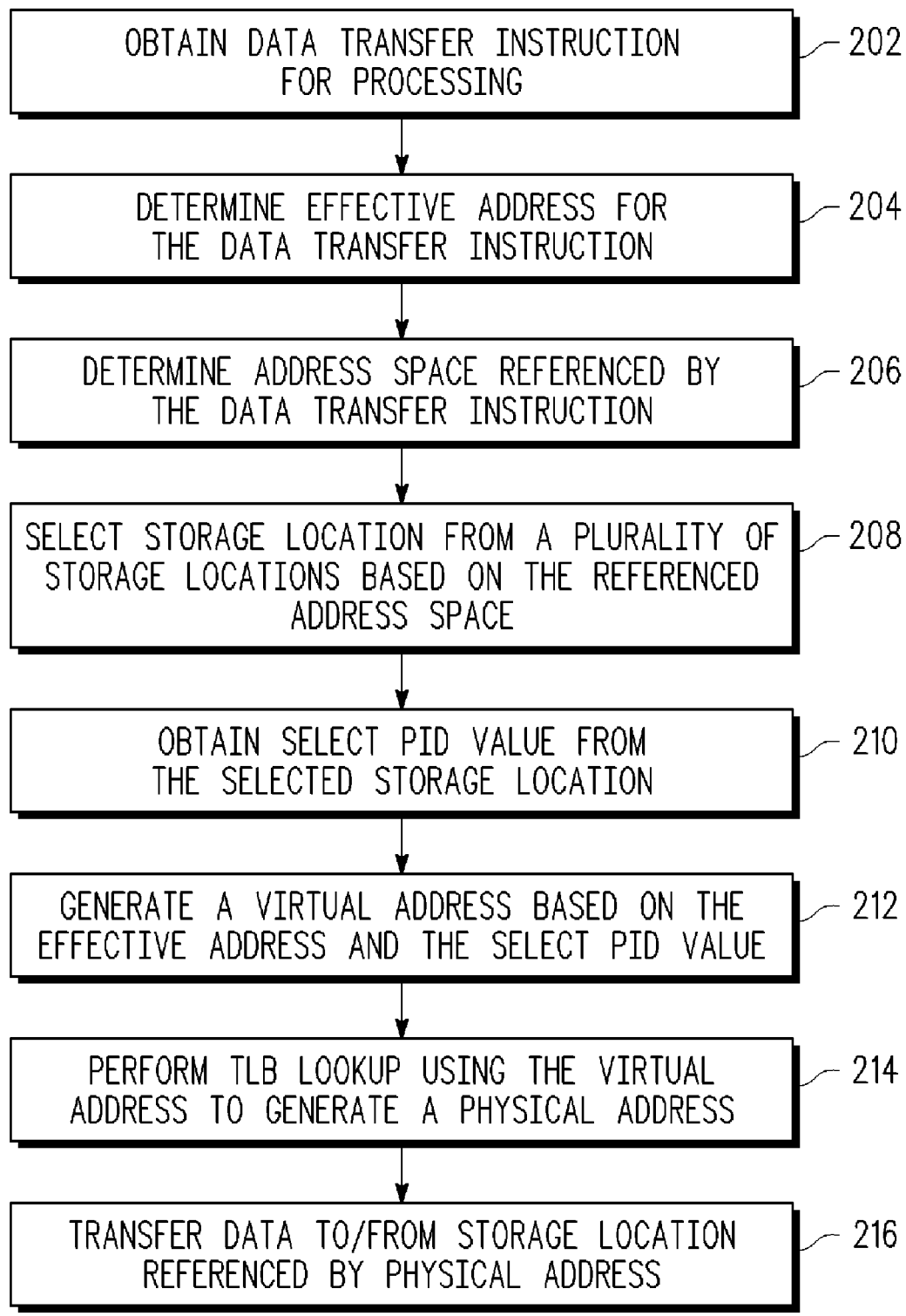
FIG. 2 is a flow diagram illustrating an example method for direct transfer of data between address spaces in accordance with at least one embodiment of the present disclosure.

FIGS. 1 and 2 illustrate exemplary techniques for the direct transfer of data between different address spaces. In accordance with at least one embodiment, the MMU of a processing system can be configured to store or otherwise have access to a plurality of values, each value representative of a different address space. The plurality of values includes, for example, one value associated with the normal address space of the processing device (e.g., the address space of the application, or alternately, the OS, being executed at the time), another value associated with a source address space, and a value associated with a destination address space. When an instruction representing a data transfer, or an assist to the data transfer between different address spaces is prepared for execution, one of the plurality of values is selected based on, for example, a characteristic (e.g., the opcode) of the instruction. An instruction to assist the data transfer may be special cache management instructions, or software prefetch hint instructions. Either a source address or a destination address (depending on whether the data transfer is from or to an address-mapped storage location) for the data transfer operation is determined based on the selected value of the plurality of values and an address value identified by the instruction. The data transfer then can be performed by the processing device using the determined address.

For ease of illustration, the exemplary techniques are described herein in the context of an extended memory address mapping whereby an effective address associated with a data transfer instruction is converted to a virtual address and the virtual address is converted to a physical address using, for example, translation lookaside buffers (TLBs), page mapping, and the like. The physical address identifies a particular storage location, such as a particular memory location or a particular address-mapped register or port of a peripheral device, to which or from which identified data is transferred. However, other address translation schemes may be implemented using the guidelines provided herein without departing from the scope of the present disclosure.

FIG. 1 illustrates an example processing system 100 configured for direct data transfers between different address spaces in accordance with at least one embodiment of the present disclosure. In the depicted example, the processing system 100 includes a processing device 102, a memory 104, and one or more peripheral components 106 and 108 connected via a bus 110. The processing device 102 can include, for example, a central processing unit (CPU), a microcontroller, and the like. The memory 104 can include, for example, a cache, system memory (e.g., random access memory), a frame buffer, and the like. The peripheral components 106 and 108 can include, for example, a bus interface (e.g., a peripheral component interconnect (PCI) interface), an interrupt controller, a serial controller, an Ethernet interface, an inter-integrated circuit (I2C) interface, and the like.

The processing device 102 includes a processing core 112, an instruction cache 114, an instruction memory management unit (MMU) 116, a data cache 118, a data MMU 120, and a bus interface unit (BIU) 122. Although the instruction cache 114 and the data cache 118 are illustrated as separate caches, in one embodiment the processing device 102 can implement a unified cache for both instructions and data. Likewise, although FIG. 1 illustrates separate MMUs for instructions and data, in one embodiment the instruction MMU 116 and the data MMU 120 can be implemented together as a single MMU.

The processing core 112 includes an instruction execution pipeline for fetching instructions and data from the instruction cache 114 and the data cache 118, respectively, and executing the data operations represented by the fetched instructions using the fetched data. The instruction execution pipeline includes an instruction unit 124 for fetching and decoding instructions and a load/store unit (LSU) 126 to manage the transfer of data between the data cache 118 and the components of the processing core 112.

The data MMU 120, in one embodiment, includes, or has access to, a plurality of storage locations (e.g., storage locations 130, 131, and 132), an address space select module 134, an address modification module 136, and a translation lookaside buffer (TLB) 138. Each of the storage locations 130-132 is configured to store a corresponding value of a plurality of values that represents a respective address space. For ease of discussion, the plurality of values is described herein as a plurality of partition identifiers (PIDs), which are concatenated with an effective address to generate a virtual address. However, other values that identify or correspond to different address spaces may be implemented without departing from the scope of the present disclosure.

The storage locations 130-132 can be implemented as, for example, registers of a register file of the data MMU 120 or as storage locations of a cache accessible to the data MMU 120. The PID values can be loaded into the corresponding storage locations 130-132 using any of a variety of techniques. In one embodiment, an operating system (OS) or hypervisor (HV) is configured to maintain different address spaces for different applications or OSs and load the PID values for selected address spaces into the storage locations 130-132 using, for example, register-load instructions. In another embodiment, an application can load some or all of the desired PID values.

The address space select module 134 (e.g., a multiplexer) is configured to select one of the storage locations 130-132. The address space select module 134 can include a plurality of data inputs, each data input having access to a corresponding one of the storage locations 130-132, a select input to receive a PID identifier 140 that serves as an identifier of which of the storage locations 130-132 is to be selected, and an output to provide a selected PID value 142 stored in the selected storage location.

The address modification module 136 includes an input to receive an effective address (EA) value 144 associated with a data transfer operation, an input to receive the selected PID value 142 from the address space select module 134 and is configured to generate a virtual address (VA) value 146 based on the EA value 144 and the selected PID value 142. As an example, the address modification module 136 can generate the VA value 146 by concatenating the selected PID value 142 and the EA value 144. Any of a variety of concatenation techniques can be implemented, such as by combining the selected PID value 142 as the most significant bits and the EA value 144 as the least significant bits of the resulting VA value 146. Alternately, the EA value 144 can be used as the most significant bits of the VA value 146 and the selected PID value 142 can be used as the least significant bits of the VA value 146. Any of a variety of alternate methods of generating the VA value 146 from the selected PID value 142 (or other value representing a particular address space) and the EA value 144 can be used without departing from the scope of the present disclosure.

The TLB 138 includes a plurality of translation tables (not shown) including descriptors of the translation of virtual addresses to physical addresses. Accordingly, the TLB 138 is configured to receive the VA value 146 and generate a physical address (PA) value 148 based on the EA value 146 and the information of the translation tables. The PA value 148 then is used to address any of a variety of memory-addressed storage locations of the processing system 100, such as, for example, a memory location 150 of the memory 104 or memory-addressed registers 152 or 154 of the peripheral components 106 or 108, respectively.

The particular PID identifier 140, which serves as an identifier of the PID value selected by the address space select module 134, can be determined based on any of a variety of factors. To illustrate, in one embodiment, the storage location 130 stores the PID value of the normal address space in which the particular application or OS operates, the storage location 131 stores a PID value identifying an source address space for load operations or other data transfer operations that result in the transfer of data from a source storage location into the processing device 102. Conversely, the storage location 132 stores a PID value identifying a destination address space for store operations or other data transfer operations that result in the transfer of data from the processing device 102 to a memory-addressed storage location. Accordingly, in one configuration the instruction unit 124 can determine whether an instruction being processed is a store operation or a load operation across different address spaces and then configure the PID identifier 140 according to whether the operation is a load operation or a store operation. For example, the instruction set of the processing set 102 can include instructions specifically for data transfer operations across different address spaces. Accordingly, in this implementation, the instruction unit 124 can determine whether an instruction represents a load operation or a store operation, and whether it is across different address spaces, based on its decoding of the opcode or other field of the instruction. In another embodiment, the type of data transfer instruction (e.g., load or store) and whether the data transfer operation represented by the data transfer instruction is across different address spaces can be determined based on a register setting, another instruction field, etc. Although the embodiment of FIG. 1 illustrates a single source PID value and a single destination PID value available to the data MMU 120, in other embodiments, more than one source PID value and/or more than one destination PID value may be available for selection at the data MMU 120.

FIG. 2 illustrates a method 200 for processing an instruction representing a transfer of data across different address spaces in accordance with at least one embodiment of the present disclosure. For ease of illustration, the method 200 is described in the context of the example embodiment of FIG. 1.

The method 200 initiates at block 202, whereby a data transfer instruction is fetched from the instruction cache 114 or otherwise obtained for processing by the processing core 112. Further, at block 202, the instruction unit 124 determines whether the data transfer instruction represents a data transfer operation across different address spaces. For the purpose of discussion, it is assumed that the data transfer instruction does represent a data transfer operation across different address spaces.

At block 204, the processing core 112 determines the effective address (e.g., EA value 144, FIG. 1) associated with the data transfer instruction. The effective address can be determined in a manner consistent with the addressing scheme of the processing system 100. To illustrate, in an index-based scheme, the data transfer instruction can include one or more fields that identify one or more registers, whereby a data operation (e.g., an add operation) is performed on the values stored in the one or more registers to generate the effective address. As another example, in an immediate-based scheme, the data transfer instruction can include a field storing an immediate value, which is then used as an offset from a fixed address or an address identified in a register to generate the effective address. Other techniques may be implemented to determine the effective address for the data transfer instruction without departing from the scope of the present disclosure.

In instances where the data transfer instruction represents a data transfer operation whereby data is transferred from an address-mapped storage location into the processing device 102 (e.g., a load operation), the effective address serves as the source address that identifies the storage location containing the value to be loaded. In instances where the data transfer instruction represents a data transfer operation whereby data is transferred from the processing device 102 into an address-mapped storage location (e.g., a store operation), the effective address serves at the destination address that identifies the storage location that is to store the data from the processing device 102.

At block 206, the processing device 102 determines the alternate address space referenced by the data transfer instruction. In at least one embodiment, the alternate address space is determined based on the type of data transfer operation represented by the data transfer instruction. Accordingly, a load-type instruction can use an alternate address space identified via, e.g., a source PID value and a store-type instruction can use an alternate address space identified via, e.g., a destination PID value. As described above, in one embodiment, the storage location 130 stores the PID value for the normal address space, the storage location 131 stores a source PID value for the alternate address space for a load-type data transfer operation, and the storage location 132 stores a destination PID value for the alternate address space for a store-type data transfer operation. Thus, the instruction unit 124 can configure a particular value for the PID identifier 140 after determining whether the data transfer instruction represents a load-type or a store-type data transfer operation, and whether the data transfer instruction represents a data transfer operation across different address spaces. At block 208, the address space select module 134 selects one of the storage locations 130-132 based on the particular value for the PID identifier 140. The particular value for the PID identifier 140 thus controls which of the normal PID value, the source PID value, or the destination PID value is selected by the address space select module 134. At block 210, the PID value stored in the selected one of the storage locations 130-132 is obtained and provided as the selected PID value 142 to the address modification module 136.

At block 212, the address modification module 136 receives the selected PID value 142 and the EA value 144 associated with the data transfer instruction and generates a virtual address (e.g., VA value 146) from these values. As discussed above, in one embodiment, the VA value 146 is generated based on a concatenation of at least part of the selected PID value 142 and at least part of the EA value 144. Other techniques for generating a virtual address or other extended address from an effective address and a PID value or other address space identifier stored at, or accessible to, the data MMU 120 can be used without departing from the scope of the present disclosure. At block 214, the TLB 138 performs a TLB lookup using the virtual address to generate a physical address (e.g., PA value 148).

At block 216, the data MMU 120 processes the data transfer operation represented by the data transfer instruction based on the PA value 148. In the event that the data transfer operation represents a load-type transfer operation, the PA value 148 is used to identify a storage location in the data cache 118 (or, if there is a cache miss, a storage location in the memory 104 or a storage location of the peripheral components 152 or 154) from which data is to be obtained for storage at the processing device 102. In the event that the data transfer operation represents a store-type transfer operation, the PA value 148 is used to identify a storage location, such as the memory location 150 of the memory 104 or memory-addressed registers 152 or 154 of the peripheral components 106 or 108, respectively of the memory location 150 of the memory 104 or one of the memory-addressed registers 152 or 154 of the peripheral components 106 or 108, respectively, to which data is to be stored.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

As used herein, the term "bus" is used to refer to a plurality of signals or conductors that may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A processing device comprising:
   a first storage location configured to store a first value associated with a first address space;
   a second storage location configured to store a second value associated with a second address space;
   a third storage location configured to store a third value associated with a third address space; and
   a memory management unit comprising:
      a first input configured to receive a first address value associated with a data transfer operation, the first address value comprising an effective address value;
      a second input configured to receive an identifier associated with the data transfer operation;
      an address space select module configured to identify a select value from the first value, the second value and the third value based on the identifier; and
      an address modification module configured to generate a second address value based on the first address value and the select value, the second address value comprising a virtual address value.

2. The processing device of claim 1, further comprising:
   an instruction unit configured to provide to the memory management unit the identifier based on the data transfer operation.

3. The processing device of claim 2, wherein:
   the first storage location is associated with load operations between different address spaces;
   the second storage location is associated with store operations between different address spaces;
   wherein the instruction unit is configured to provide a first identifier value as the identifier in response to the data transfer operation comprising a load operation between different address spaces and to provide a second identifier value as the identifier in response to the data transfer operation comprising a store operation between different address spaces; and
   wherein the address space select module is configured to identify the first value as the select value in response to the identifier comprising the first identifier value and to identify the second value as the select value in response to the identifier comprising the second identifier value.

4. The processing device of claim 2, wherein the instruction unit is configured to provide the identifier based on an opcode of an instruction representative of the data transfer operation.

5. The processing device of claim 1, wherein the address modification module is configured to concatenate the first address value and the select value to generate the second address value.

6. The processing device of claim 1, wherein the memory management unit further comprises:
   a translation lookaside buffer comprising an input configured to receive the second address value and an output to provide a third address value based on the second address value.

7. The processing device of claim 6, wherein the third address value comprises a physical address value.

8. A method comprising:
   receiving, at an instruction unit of a processing device, a first instruction representing a first data transfer operation between different address spaces of the processing device;
   determining a first address value associated with the first data transfer operation, the first address value comprising an effective address value;
   determining a first value from at least three values stored at the processing device based on the first data transfer operation, each of the at least three values associated with a corresponding address space of a plurality of address spaces; and
   generating, at the processing device, a second address value based on the first address value and the first value, the second address value comprising a virtual address value.

9. The method of claim 8, further comprising:
   loading data at the processing device from a storage location associated with the second address value in response to the first data transfer operation comprising a load operation.

10. The method of claim 8, further comprising:
    storing data from the processing device at a storage location associated with the second address value in response to the first data transfer operation comprising a store operation.

11. The method of claim 8, further comprising:
    storing the first value of the plurality of values at a first storage location of a plurality of storage locations of the processing device, the first storage location associated with a first address space of the plurality of address spaces;

storing a second value of the plurality of values at a second storage location of the plurality of storage locations, the second storage location associated with a second address space of the plurality of address spaces; and storing a third value of the plurality of values at a third storage location of the plurality of storage locations, the third storage location associated with a third address space of the plurality of address spaces.

12. The method of claim 11, wherein determining the first value from the at least three values comprises:
   determining a type of the first data transfer operation;
   selecting the first storage location from the plurality of storage locations based on the type; and
   accessing the first storage location to obtain the first value.

13. The method of claim 8, wherein generating the second address value comprises concatenating the first address value and the first value.

14. The method of claim 8, wherein generating the second address value comprises:
   generating a third address value based on the first address value and the first value; and
   accessing a translation lookaside buffer to determine the third address value based on the second address value.

15. The method of claim 8, further comprising:
   receiving, at the instruction unit, a second instruction representing a second data transfer operation between different address spaces of the processing device;
   determining a third address value associated with the second data transfer operation;
   determining a second value from the at least three values based on the second data transfer operation; and
   generating, at the processing device, a fourth address value based on the third address value and the second value.

16. A method comprising:
   receiving, at an instruction unit of a processing device, a first instruction representing a first data transfer operation between different address spaces of the processing device;
   determining a first address value associated with the first data transfer operation;
   determining a first value from at least three values stored at the processing device based on the first data transfer operation, each of the at least three values associated with a corresponding address space of a plurality of address spaces;
   generating, at the processing device, a second address value based on the first address value and the first value; and
   accessing a translation lookaside buffer to determine a third address value based on the second address value.

17. The method of claim 16, further comprising:
   loading data at the processing device from a storage location associated with the second address value in response to the first data transfer operation comprising a load operation.

18. The method of claim 16, further comprising:
   storing data from the processing device at a storage location associated with the second address value in response to the first data transfer operation comprising a store operation.

19. The method of claim 16, further comprising:
   storing the first value of the at least three values at a first storage location of a plurality of storage locations of the processing device, the first storage location associated with a first address space of the plurality of address spaces;
   storing a second value of the at least three values at a second storage location of the plurality of storage locations, the second storage location associated with a second address space of the plurality of address spaces; and
   storing a third value of the at least three values at a third storage location of the plurality of storage locations, the third storage location associated with a third address space of the plurality of address spaces; and
   wherein determining the first value from the at least three values comprises:
      determining a type of the first data transfer operation;
      selecting the first storage location from the plurality of storage locations based on the type; and
      accessing the first storage location to obtain the first value.

20. The processing device of claim 16, wherein the first address value comprises an effective address value, the second address value comprises a virtual address value, and the third address value comprises a physical address value.

* * * * *